United States Patent
Wu et al.

(10) Patent No.: US 7,633,760 B2
(45) Date of Patent: Dec. 15, 2009

(54) KVM SWITCHING DEVICE, SEVER RACK ASSEMBLY AND SLIDING MECHANISM THEREOF

(75) Inventors: Sui-An Wu, Taipei (TW); Ling-Wei Lee, Taipei (TW)

(73) Assignee: ATEN International Co., Ltd, Taipei (TW)

(*) Notice: Subject to any disclaimer, the term of this patent is extended or adjusted under 35 U.S.C. 154(b) by 341 days.

(21) Appl. No.: 11/750,360

(22) Filed: May 18, 2007

(65) Prior Publication Data

US 2008/0284300 A1     Nov. 20, 2008

(51) Int. Cl.
*H05K 5/00* (2006.01)
*H05K 7/00* (2006.01)
*H05K 7/16* (2006.01)
*A47B 88/00* (2006.01)

(52) U.S. Cl. .............. 361/727; 361/679.02; 384/18; 384/19; 384/20

(58) Field of Classification Search ............ 361/679.02, 361/727; 384/18–20, 46, 52
See application file for complete search history.

(56) References Cited

U.S. PATENT DOCUMENTS 3,469,893 A * 9/1969 Hudson ................. 384/54
3,744,862 A * 7/1973 Schwartz ............... 384/527
6,856,505 B1 * 2/2005 Venegas et al. ....... 361/679.05
2006/0289370 A1 * 12/2006 Shih ..................... 211/26

FOREIGN PATENT DOCUMENTS

TW     M298931     10/2006

OTHER PUBLICATIONS

English Abstract of TW M298931.

* cited by examiner

*Primary Examiner*—Jayprakash N Gandhi
*Assistant Examiner*—Anthony M Haughton
(74) *Attorney, Agent, or Firm*—Keith P. Taboada; Patterson & Sheridan LLP

(57) ABSTRACT

A KVM switch device is provided. The KVM switch device comprises a frame, a switch part fixed to the frame, a console unit movably connected to the switch part, and a sliding mechanism disposed between the console unit and the frame, wherein the switch part communicates with the console unit. The sliding mechanism comprises at least one guide rod disposed on the frame and at least one sliding bearing sliding along the guide rod. The console unit is movable between a closed position and an open position by the sliding bearing sliding along the guide rod.

11 Claims, 6 Drawing Sheets

KVM SWITCHING DEVICE, SEVER RACK ASSEMBLY AND SLIDING MECHANISM THEREOF

BACKGROUND OF THE INVENTION

1. Field of the Invention

The invention relates in general to KVM (keyboard-video-mouse) switch devices and in particular to a KVM switch device having a sliding mechanism.

2. Description of the Related Art

Conventional 1U computer servers assembled on a standard 1U server rack is an industry standard arrangement. Each slot of the server rack is about 1.75 inches (about 4.5 centimeters), so that the 1U server and the server rack effectively conserve the space occupied by the computer servers. Moreover, the 1U servers and racks are more efficiently controlled because the 1U servers and racks can be centrally managed and easily stacked.

To conveniently control the stacked 1U computer servers on the server rack, KVM (keyboard-video-mouse) switches are usually used to connect and control the computer servers. Hence, the quantity of the displays and keyboards for controlling the computer servers can be effectively reduced and occupied space thereof also reduced. However, due to the height constraints on the 1U server rack, the dimensions of the keyboard and the display have to fulfill the dimension limitations to operate on the server rack. Therefore, various sliding keyboard and display modules have been provided to operate on the 1U server rack.

BRIEF SUMMARY OF THE INVENTION

According to an aspect of the invention, a server rack assembly of a KVM switch device is provided. The server rack assembly comprises a frame, a bracket, and a sliding mechanism disposed therebetween. The sliding mechanism comprises at least one guide rod disposed on the frame and at least one sliding bearing connected to the bracket. The sliding bearing scrapes dust on the guide rod when sliding along the guide rod.

According to a second aspect of the invention, a sliding mechanism of a KVM switch device is provided. The sliding mechanism comprises at least one guide rod disposed on a first body and at least one sliding bearing disposed on a second body. The second body is reciprocally movable relative to the first body by the sliding bearing sliding along the guide rod.

According to a third aspect of the invention, a KVM switch device is provided. The KVM switch device comprises a frame, a switch part fixed to the frame, a console unit movably connected to the switch part, and a sliding mechanism disposed between the console unit and the frame, wherein the switch part communicates with the console unit. The sliding mechanism comprises at least one guide rod disposed on the frame and at least one sliding bearing sliding along the guide rod. The console unit is movable between a closed position and an open position by the sliding bearing sliding along the guide rod.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
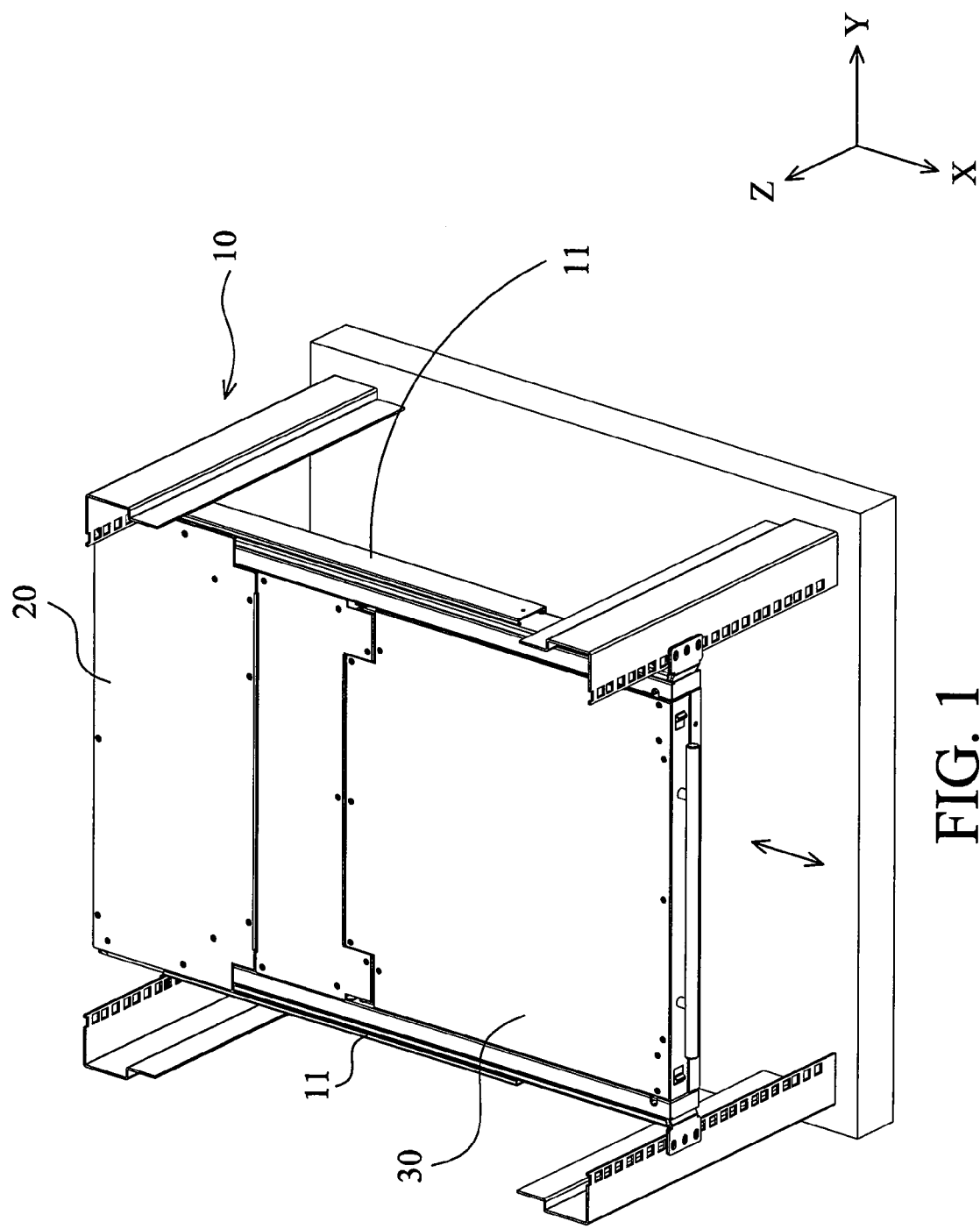
FIG. 1 is a perspective diagram of a KVM switch device when a console unit is in a closed position.
Figure 2:
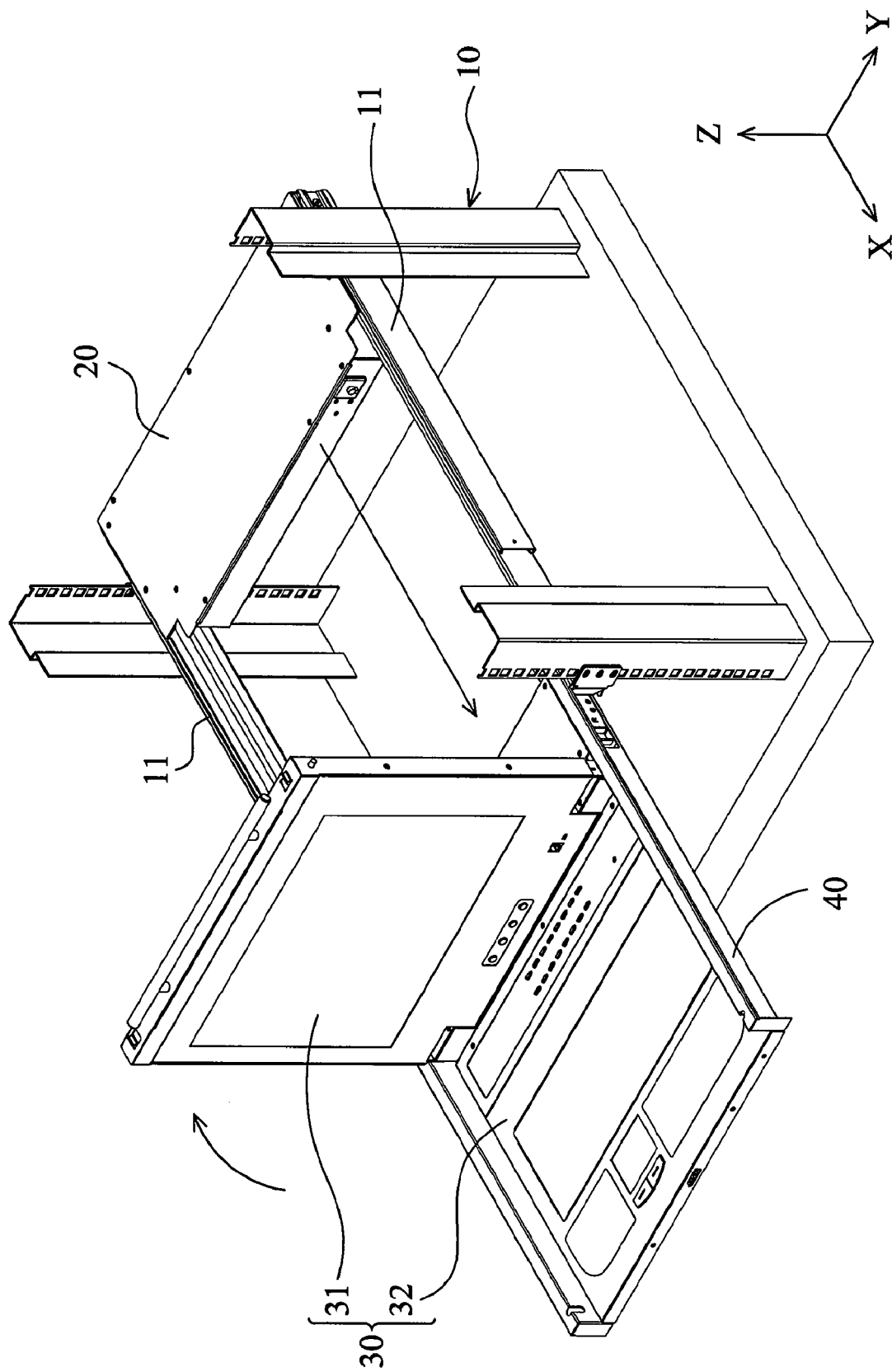
FIG. 2 is a perspective diagram of a KVM switch device when a console unit is in an open position.

Referring to FIGS. 1 and 2, an embodiment of a KVM switch device primarily comprises a server rack 10, two longitudinal frames 11 mounted on the server rack 10, a switch part 20 connected to the frames 11, and a console unit 30 movable along the X axis between a closed position (FIG. 1) and an open position (FIG. 2) with respect to the frames 11. Here, the switch part 20 and the console unit 30 are electrically communicated with each other via flexible cables (not shown) for controlling different servers.

Figure 3:
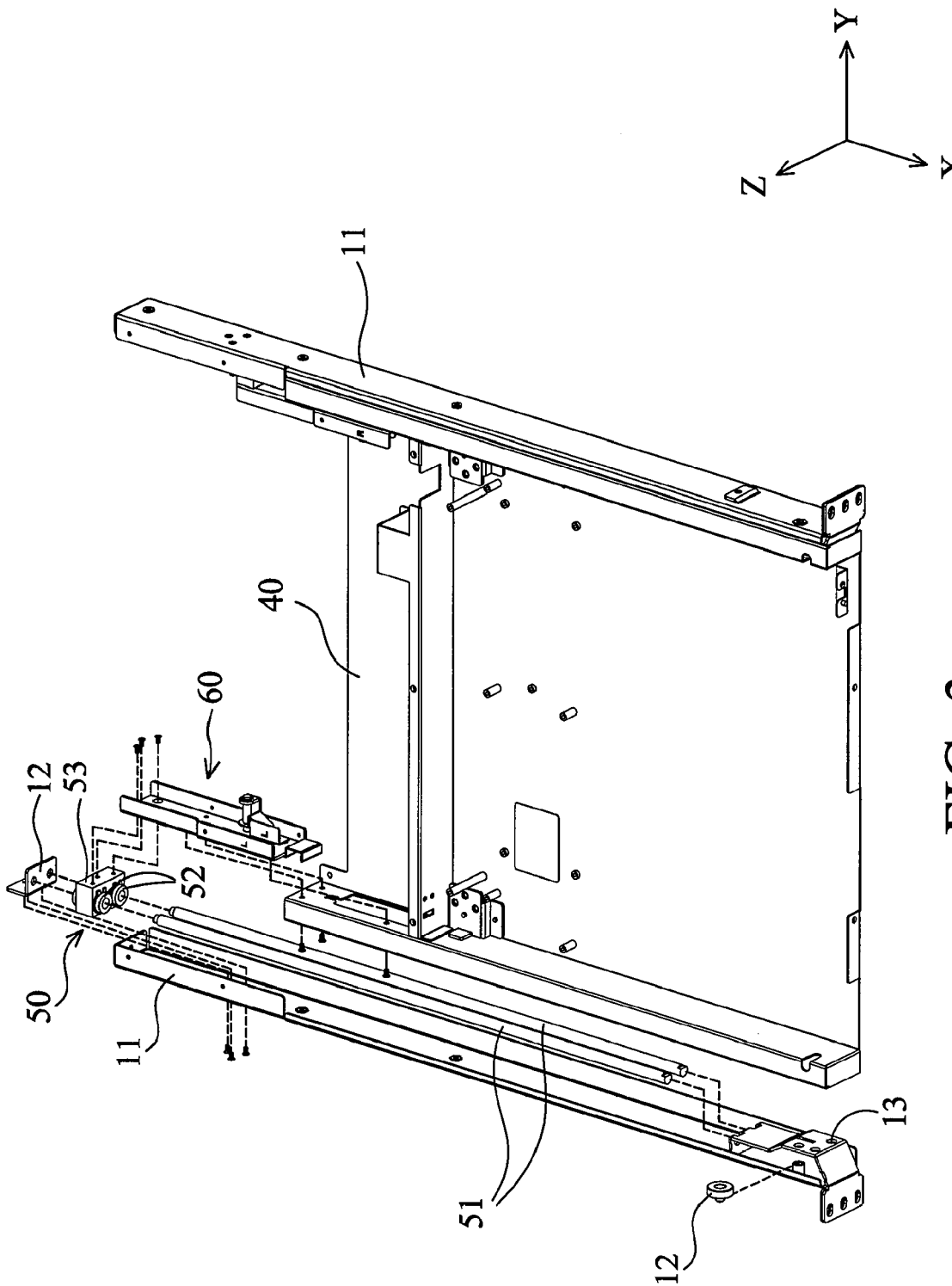
FIG. 3 is an exploded diagram of a frame, a bracket, a sliding mechanism, and a positioning mechanism.

As shown in FIGS. 2 and 3, the console unit 30 is held by a bracket 40, wherein the bracket 40 is movably connected to the frames 11 via a sliding mechanism (discussed subsequently in connection with FIGS. 3, 4A and 4B as item 50). In this embodiment, the console unit 30 includes a display part 31 and an input part 32 having a keyboard and a pointing device, wherein the display part 31 is pivotally connected to the input part 32. When using the KVM switch device, the console unit 30 is pulled from the closed position (FIG. 1) to the open position (FIG. 2), and the display part 31 is expanded with respect to the input part 32, as the arrow indicates in FIG. 2. When the display part 31 is collapsed and substantially covers the input part 32, the console unit 30 can be returned to the closed position shown in FIG. 1. In one embodiment, the display part 31 includes liquid crystal display (LCD) panel or organic light emitting diode (OLED) panel. The console unit 30 can control anyone of servers connected to the switch part 20.

Referring to FIG. 3, the sliding mechanism 50 is disposed between the frame 11 and the bracket 40, facilitating smooth sliding of the bracket 40 along X axis. Furthermore, a positioning mechanism 60 connects the sliding mechanism 50 and the bracket 40. When the console unit 30 and the bracket 40 move from the closed position (FIG. 1) to the open position (FIG. 2) with respect to the frame 11 along X axis, the positioning mechanism 60 is engaged with a positioning hole 13 of the frame 11, such that the console unit 30 is retained in the open position.

Figure 4B:
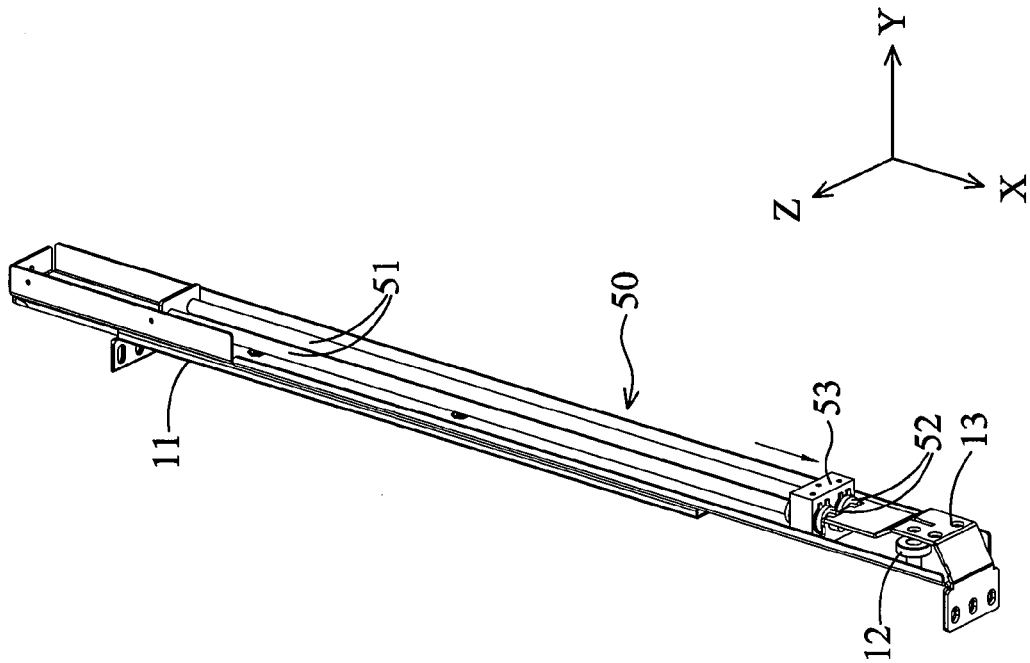
FIGS. 4A and 4B are perspective diagrams of the sliding mechanism movably connected to a frame.
Figure 4A:
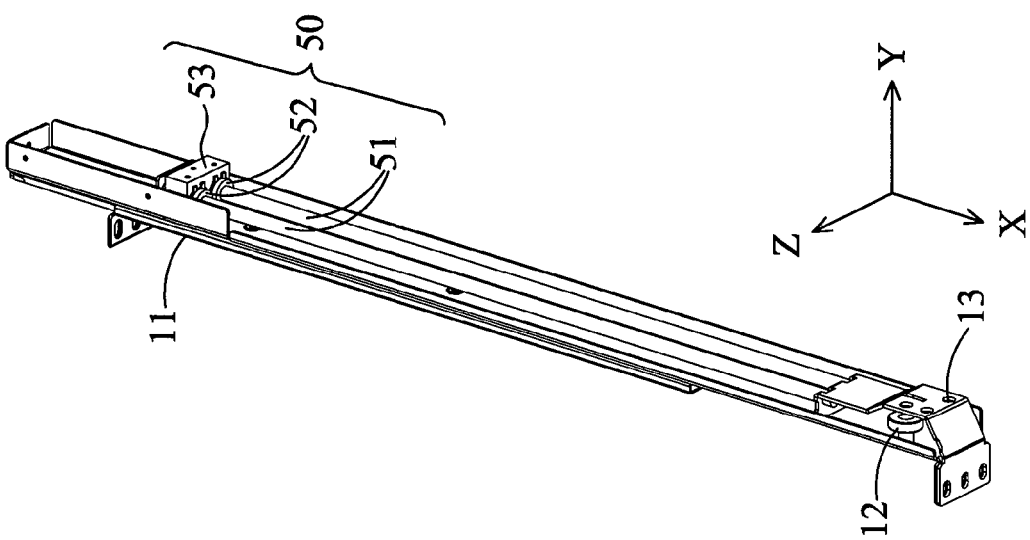

As shown in FIGS. 3, 4A and 4B, the sliding mechanism 50 primarily comprises at least one guide rod 51, at least one tubular sliding bearing 52 sliding along the guide rod 51, and a slider 53 connected to the positioning mechanism 60. In this embodiment, two sliding bearings 52 are received in the slider 53, and correspondingly, two guide rods 51 are disposed through the sliding bearings 52 and fixed to the frame 11. Hence, the slider 53 is movable along X axis by the sliding bearings 52 sliding on the guide rods 51, as shown in FIGS. 4A and 4B, facilitating smooth movement of the bracket 40 and the console unit 30 between the closed and open positions. Moreover, a roller 12 is disposed on the frame 11 for supporting the bracket 40 and facilitating stable sliding thereof.

Figure 5:
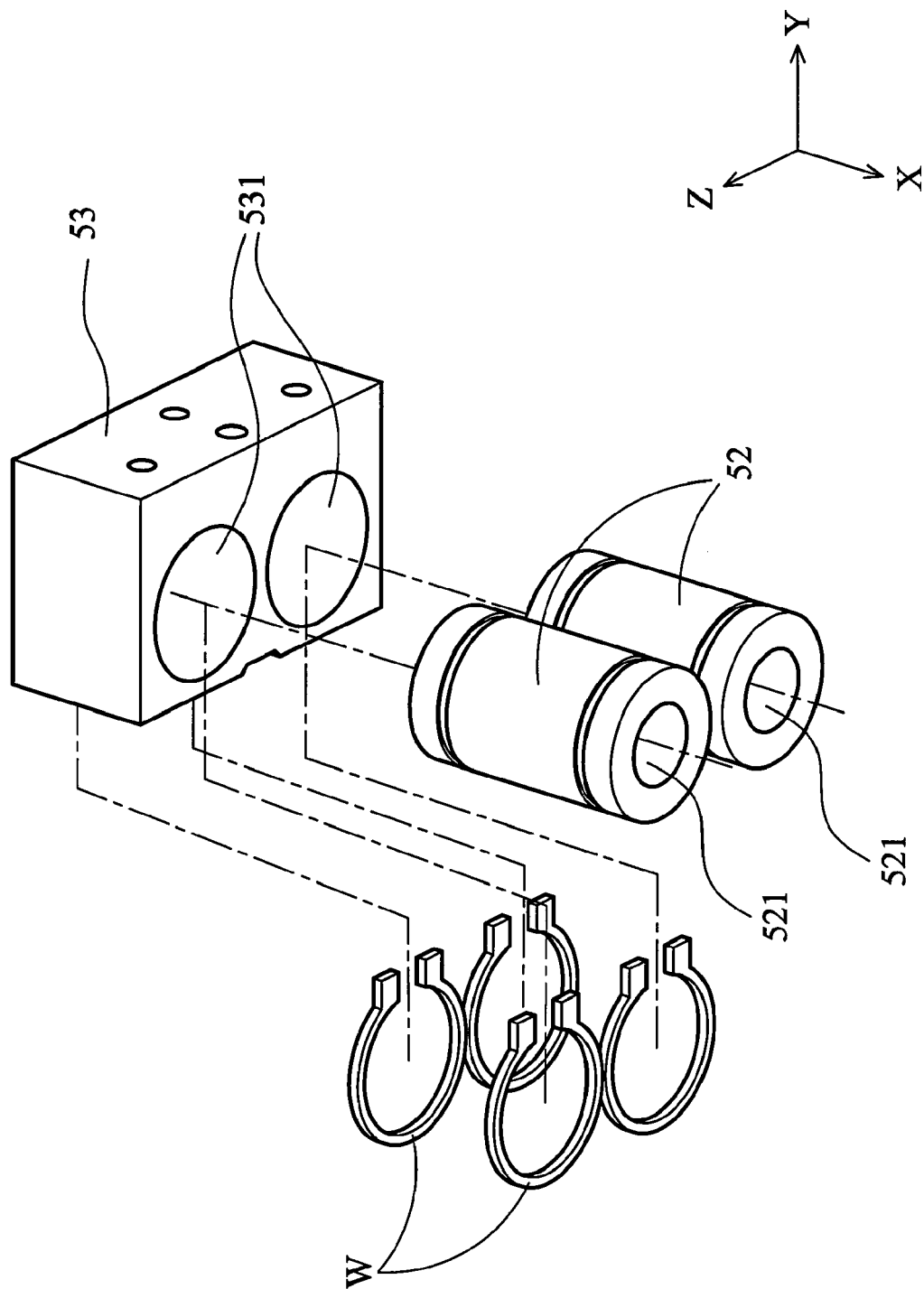
FIG. 5 is an exploded diagram of washers, sliding bearings, and a slider.

Referring to FIG. 5, the sliding bearings 52 are received in two openings 531 of the slider 53, respectively. Furthermore, two washers W are disposed on an outer surface of each sliding bearing 52 and located at opposite sides of the slider 53, to retain the sliding bearing 52 in the opening 531. The sliding bearing 52, such as a self-lubricating bearing, can scrape dust on the guide rod 51 when sliding, preventing contamination and failure of the sliding mechanism 50. In one embodiment, the sliding bearing 52 has a number of rolling balls disposed therein.

Figure 6B:
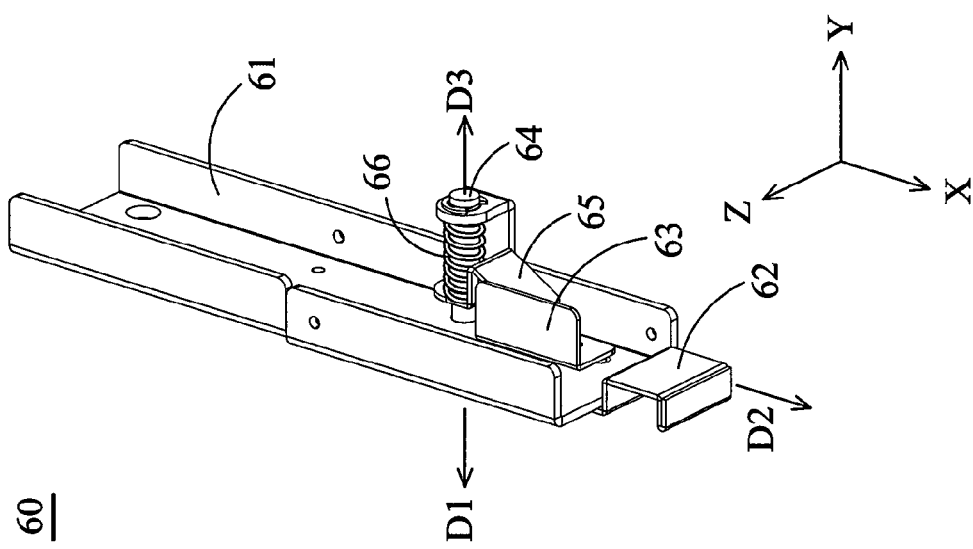
FIG. 6B is a perspective diagram of the positioning mechanism in FIG. 6A.
Figure 6A:
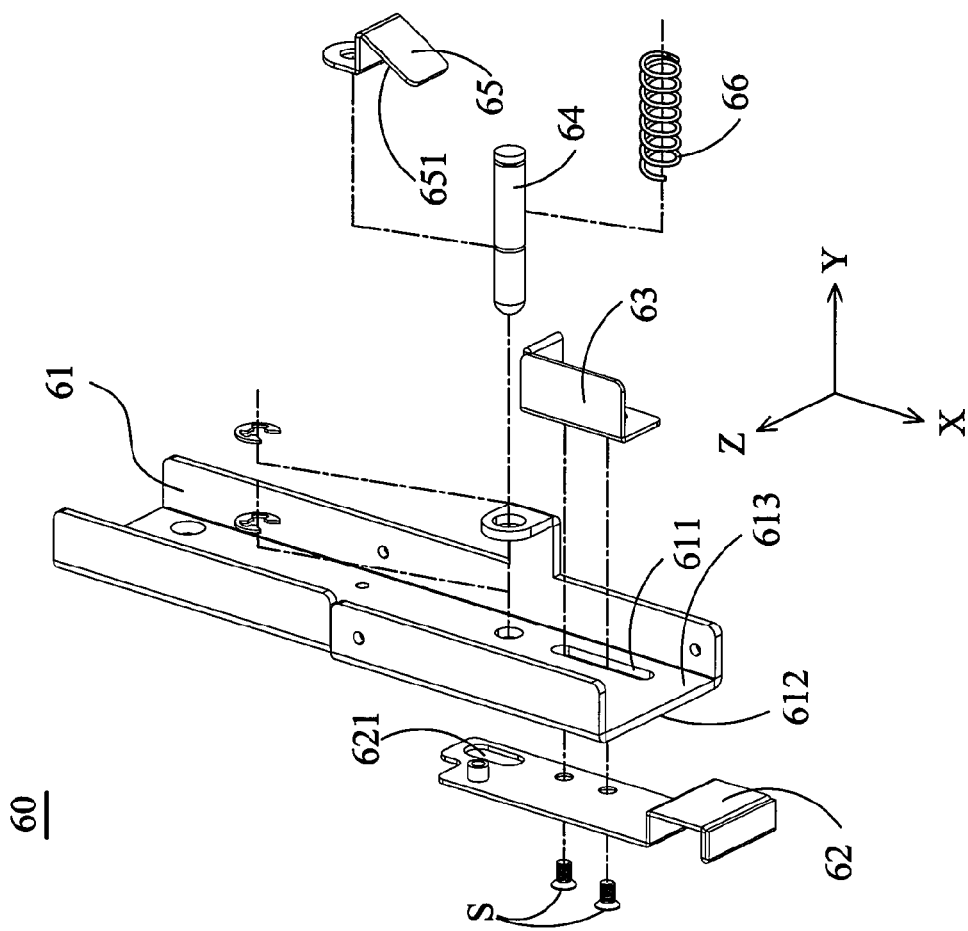
FIG. 6A is an exploded diagram of a positioning mechanism.

Referring to FIGS. 6A and 6B, the positioning mechanism 60 primarily comprises a base 61 fixed to the bracket 40, an external control member 62, an internal pushing member 63, a positioning pin 64 movably disposed on the base 61 along Y axis, a movable member 65 sliding along the positioning pin 64, and an elastic element 66 pressing the movable member 65 and the positioning pin 64. As shown in FIGS. 6A and 6B, the external control member 62 is movably disposed on an outer side 612 of the base 61. The internal pushing member 62 is movably disposed on an inner side 613 of base 61 and connected to the external control member 61 by screws S. When the bracket 40 and the console unit 30 are pulled to the open position (FIG. 2), the elastic element 66 presses the movable member 65 and the positioning pin 64 along a first direction D1, as shown in FIG. 6B, such that the positioning pin 64 moves through a through hole 621 of the external control member 61 and engages with the positioning hole 13 of the frame 11 (FIG. 3), to retain the console unit 30 in the open position.

When releasing the positioning pin 64 from the positioning hole 13, the external control member 62 is pulled along a second direction D2, as shown in FIG. 6B. Here, as the internal pushing member 63 is moved with the external control member 62 along the second direction D2, the internal pushing member 63 slides on an angled surface 651 (FIG. 6A) of the movable member 65 and pushes the movable member 65 along a third direction D3 (FIG. 6B), opposite to the first direction D1, such that the positioning pin 64 is disengaged from the positioning hole 13.

In some embodiments, the display part 31 in FIG. 2 can also be a collapsible flat display pivotally connected to the sliding mechanism. In some embodiments, the display part 31 and the input part 32 of the console unit 30 are independently movable with respect to the frame 11 by different sliding mechanisms.

KVM switch devices and sever rack assemblies thereof having sliding mechanisms are provided according to the embodiments. A KVM switch device has a positioning mechanism and a sliding mechanism, preventing contamination thereof and improving safety of operation.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A keyboard-video-mouse (KVM) switch device, comprising:
   a frame;
   a switch part connected to the frame;
   a console unit communicating with the switch part; and
   a sliding mechanism disposed between the console unit and the frame, comprising:
      at least one guild rod disposed on the frame;
      at least one sliding bearing connecting the console unit and sliding along the guild rod, wherein the console unit is movably connect to the switch part, such that the console unit is stored or extended to an open position while the switch part remains in a fixed position;
      a slider having an opening with the sliding bearing received therein; and
      two washers disposed on an outer surface of the sliding bearing and located at opposite sides of the slider such that the sliding bearing is retained in the opening.

2. The KVM switch of claim 1, the sliding mechanism further comprising the plurality of sliding bearings and the plurality of guild rods corresponding thereto.

3. The KVM switch device of claim 1, wherein the slider has the sliding bearing fixed thereto, wherein the slider is connected to the console unit, and the guide rod is disposed through the slider.

4. The KVM switch of claim 1, wherein the sliding bearing has a tubular structure.

5. The KVM switch device of claim 1, wherein the sliding bearing is a self-lubricating bearing.

6. The KVM switch device of claim 1, further comprising a positioning mechanism connected to a bracket, wherein the positioning mechanism has a positioning pin engaged with a positioning hole of the frame when the bracket moves to an open position with respect to the frame.

7. The KVM switch device of claim 6, wherein the positioning mechanism comprises an elastic element for pressing the positing pin to engage with the positing hole when the bracket moves to the open position.

8. The KVM switch device of claim 6, wherein the positioning mechanism comprises an external control member to move the positioning pin away from the positioning hole.

9. The KVM switch device of claim 1, wherein the console unit comprises:
   an input part; and
   a display part, pivotally connecting to the input part and substantially covering the input part when in a collapsed state.

10. The KVM switch device of claim 1, wherein the console unit comprises an input part including a keyboard and a pointing device, and the input part is connected to the sliding mechanism.

11. The KVM switch device of claim 1, wherein the console unit comprises a flat display pivotally connected to the sliding mechanism.

\* \* \* \* \*